(12) United States Patent
Parker (10) Patent No.: US 7,387,438 B2
(45) Date of Patent: Jun. 17, 2008

(54) REUSABLE, RESETTABLE, CRITICAL TEMPERATURE INDICATOR

(76) Inventor: Robert Parker, 60617 Golf Village Loop, Bend, OR (US) 97702

( * ) Notice: Subject to any disclaimer, the term of this patent is extended or adjusted under 35 U.S.C. 154(b) by 111 days.

(21) Appl. No.: 11/264,720

(22) Filed: Nov. 2, 2005

(65) Prior Publication Data
US 2007/0098039 A1    May 3, 2007

(51) Int. Cl.
- G01K 11/06  (2006.01)
- G01K 13/00  (2006.01)
- G01K 3/00   (2006.01)

(52) U.S. Cl. .................. 374/160; 374/104; 374/156
(58) Field of Classification Search ......... 374/100–109, 374/156, 160, 162, 163; 116/216
See application file for complete search history.

(56) References Cited

U.S. PATENT DOCUMENTS

| | | | | |
|---|---|---|---|---|
| 2,614,430 A * | 10/1952 | Ballard et al. | ............... | 374/106 |
| 2,856,885 A * | 10/1958 | Huyck et al. | ............... | 116/106 |
| 3,405,678 A * | 10/1968 | Frenkel et al. | ............... | 374/141 |
| 3,465,590 A * | 9/1969  | Thompson et al. | .......... | 374/160 |
| 3,618,558 A * | 11/1971 | Tepfer | ......................... | 116/216 |
| 3,695,903 A * | 10/1972 | Telkes et al. | ................ | 116/207 |
| 3,701,282 A * | 10/1972 | Peterson | ..................... | 116/21 |
| 3,724,360 A * | 4/1973  | Kliewer et al. | ................ | 99/342 |
| 3,922,917 A * | 12/1975 | Ayres | ......................... | 374/106 |
| 3,942,467 A * | 3/1976  | Witonsky | .................... | 116/207 |
| 4,011,552 A * | 3/1977  | Quirke | ....................... | 340/585 |
| 4,028,944 A * | 6/1977  | Erb | ............................ | 374/160 |
| 4,064,828 A * | 12/1977 | Clark | ......................... | 116/215 |
| 4,137,049 A * | 1/1979  | Couch et al. | .................. | 422/56 |
| 4,189,942 A * | 2/1980  | Giezen et al. | ............... | 374/104 |
| 4,457,253 A * | 7/1984  | Manske | ...................... | 116/216 |
| 4,571,580 A * | 2/1986  | Winteler et al. | ............. | 340/594 |
| 4,664,056 A * | 5/1987  | Jehanno | ...................... | 116/217 |
| 4,805,188 A * | 2/1989  | Parker | ........................ | 374/141 |
| 4,844,622 A * | 7/1989  | Weiss | ......................... | 374/102 |
| 5,215,378 A * | 6/1993  | Manske | ...................... | 374/105 |
| 5,404,834 A * | 4/1995  | Murphy | ...................... | 116/216 |
| 5,816,493 A * | 10/1998 | Pirkle | ..................... | 236/101 R |
| 5,924,294 A * | 7/1999  | Tiby | ............................ | 62/125 |
| 6,176,197 B1 * | 1/2001 | Thompson | .................. | 116/217 |
| 6,302,054 B1 * | 10/2001 | Mayer, III | ................... | 116/216 |

(Continued)

Primary Examiner—Gail Verbitsky
(74) Attorney, Agent, or Firm—Renner, Otto, Boisselle & Sklar, LLP

(57) ABSTRACT

A transparent vacuum formed vessel 1 is filled with a liquid 3 at room temperature that will become a solid at freezing temperature and a low density float material 4. After freezing, the vessel is turned upside down so that upon thawing, the vivid colored float will move to the top of the vessel showing a thaw. The devise can be reused.

The same concept can be used as a cooking aid by using a transparent sealed tubular 1 assembly inserted in the food with a solid cylinder 3 that will melt at some critical temperature allowing the low density float to rise to the top of the indicator visibly protruding from the food. More than one meltable cylinder, 3 & 8 and float, 4 & 5 may be used as a warning and ready indicator.

Combinations of solid dense particulates and low density materials may also be used for color changing indicators. A permanent magnet attached to a float can be used to trigger an audible alarm, which can be incorporated in various cooking utensils to show cooking temperatures and times.

22 Claims, 4 Drawing Sheets

U.S. PATENT DOCUMENTS 6,403,131 B1 * 6/2002 Carmon ...................... 426/233
6,425,686 B1 * 7/2002 Zaldivar et al. ............... 374/16
6,843,199 B2 * 1/2005 Abe et al. ................... 116/106
7,011,445 B1 * 3/2006 Hamilton et al. ............ 374/201

* cited by examiner

REUSABLE, RESETTABLE, CRITICAL TEMPERATURE INDICATOR

BACKGROUND OF THE INVENTION

1. Technical Field of the Invention

The present invention relates to a reusable, resettable indicator that will show when thawing has occurred. The device may be stored at any ambient temperature and simply activated.

The same concept may be used for cooking of many food products such as meat, fish, poultry, and other foods. It can be used for heating foods in microwave ovens. It can also be used to indicate fever.

It has many other uses, such as shipping perishable products to show temperature abuse, frozen blood, pharmaceuticals, fruits and vegetables. It may also be used to show sterilization has been achieved in an autoclave and other applications. It may be incorporated in cooking utensils to provide audible alarms to show when food is cooked.

2. Description of the Prior Art

A provisional patent U.S. Application Ser. No. 60/624383 entitled Critical Temperature Indicator was filed Nov. 2, 2004. Volk Industries has developed and marketed pop up food grade indicators as described in U.S. Pat. Nos. 5,799,606, 5,988,102, etc. This concept uses a solid material to hold a spring loaded element in place until, upon achieving a critical temperature, melts and releases the spring element to visually show an internal critical temperature has been achieved.

This concept has many disadvantages. It is complex and costly; it uses metal components which would not work in a microwave oven. But the bigger problems are virtually all materials are viscoelastic when the melt temperature is approached. Hence the spring may release at a range of temperatures depending on heating rate.

In addition, a sliding mechanical component may allow potential contaminating materials to interact with the food.

Further, it cannot show a lower temperature or warning time before a critical temperature has been achieved.

In an attempt to address some of these flaws, U.S. Pat. No. 6,176,197, entitled TEMPERATURE INDICATOR EMPLOYING COLOR CHANGE by Gary M. Thompson was disclosed. Here, two different melt temperature materials are enclosed in a tubular translucent structure. Upon melting, because of density differences, one material rises and mixes with the other material causing a color change.

While this concept improves on the flaws of previous concepts, it still has some problems. It is not reusable, it does not provide a precursor warning indicator and it also tends to be more expensive and complex, because it is not cold assembled and uses hot fluid materials, it can only be used for high temperature cooking applications.

DISCLOSURE OF INVENTION

Briefly described, the temperature indicator of the present invention employs a solid low density material that is in contact with a meltable higher density material that upon reaching some critical temperature turns into a liquid and allows the solid low density material to float to the top.

These materials are encased in an elongated transparent container. By lowering the temperature and freezing the liquid with the low density material on the top, one may turn the indicator 180° or upside down and upon heating, the low density material will float to the top indicating that a critical temperature has been exceeded.

This is a closed system that is reusable and can be reset. The floating element can be coated with bright colors and is easily viewable.

If the container is tubular or rectangular, the floating element will not float to the top unless the solid has been substantially converted into a liquid. Partial thawing will allow the solid floating element to partially float to the top indicating incomplete thawing.

The transparent vessel may be made from vacuum formed transparent plastics for low temperature applications such as a thaw indicator to show if the freezer compartment thawed from a power failure or open door.

For high temperature applications such as cooking or sterilization, a high temperature transparent tubular vessel may be employed.

According to another aspect of the invention, one may employ two solids with sharp melting point materials aligned in a tubular vessel or container where the top material has a lower melt temperature than the other solid material. Between the two cylinders of material is a low density solid with a bright color, perhaps yellow. At the bottom of higher temperature material is another low density material that is bright green or other color.

The device may be used for high temperature cooking and may be easily assembled at room temperature.

When inserted in various foods with the top part protruding for easy viewing, the first column or cylinder will melt upon cooking allowing the yellow indicator to float to the top showing almost done, some cooking time to go. When both columns melt the yellow green floats will show cooking is complete.

While two melt temperature polymers may be used, one may also use two similar melting point materials when cooking, because when heating in an oven, a temperature gradient occurs in the food with the highest temperatures on the outside and the coolest internally.

When some internal temperature is achieved, the first float will go to the top and then followed some time later by the second float when the deeper part of the food has achieved the same critical temperature.

While this device may not be reusable, a single critical temperature polymer with a single floating element can be reused simply by turning the tubular device 180° or upside down.

According to another embodiment of this invention, one may use colorful high density powders or flakes (metal) at the top end of the column of the sharp melting polymer and a different color low density material at the bottom, all encased in a transparent tubular device.

Upon melting at the top, the flakes (iron flakes) will fall to the bottom past the float, which will float to the top, so that the top will go from one color to another. This might be useful in cooking to show when food is almost done.

This same concept can be used as a thaw indicator using high density and low density materials.

One may use high density materials by itself for a thaw indicator by freezing the water in a transparent vessel with the high density material on the bottom and then rotating the One may use high density materials by itself for a thaw indicator by freezing the water in a transparent vessel with the high density material on the bottom and then rotating the vessel 180°. Upon thawing, the high density material will go to the bottom. The low density solid float concept is preferred.

All of these concepts are simple and inexpensive. They avoid placing large mechanical loads on the melting solid material. This is important because as the material approaches melt, it becomes viscoelastic and high stresses would result in incorrect readings.

In general, the low density material is the preferred material used in the thaw device because of lower cost and ease of pigmentation and the potential to show a partial thaw.

According to another aspect of the invention, the floating material may have a permanent magnet affixed to the top and bottom of it. On top of vessel one, it may have a mechanical or battery operated audible alarm with a switch that is activated by magnetic attraction from the magnet as it floats to the top of the tubular vessel. The magnet on top and bottom allows it to be reused by merely reversing 180° the top and bottom with respect to the audible alarm device.

BRIEF DESCRIPTION OF DRAWINGS

Throughout the several views, like reference numerals refer to like parts wherein.

This concept may be useful for sterilization or cooking of products such as eggs or in pressure cookers. The time it takes for heat diffusion to cause the meltable solid to become a liquid and allow activation is the function of the size of the sensor and the melt temperature. Hence, for cooking eggs one may use a material that melts at 68° C. (the temperature at which an egg coagulates) and has a size the equivalent of an egg.

The advantage of this device is that it can provide precise cooking time by being incorporated in the lids of pressure cookers, pot lids, and other devices. It would tell the user both audibly and visually when the food is cooked and it would be inexpensive and reusable.

DETAILED DESCRIPTION OF THE INVENTION

Reference will now be made in detail to the preferred embodiments of the invention, examples of which are illustrated in the accompanying drawings.

While the invention will be described in conjunction with preferred embodiments, it will be understood that the described embodiments are not intended to limit the invention specifically to those embodiments.

On the contrary, the invention is intended to cover alternatives, modifications, and equivalents which may be included within the spirits and scope of the invention as defined by the appended claims.

Figure 1:
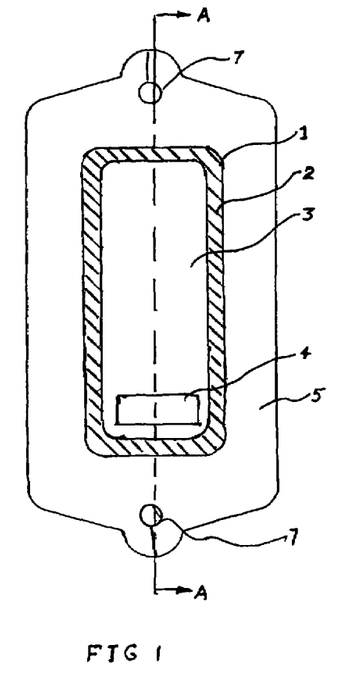
FIG. 1 shows the front view of a thaw indicator with a low density float constrained by a frozen liquid in a transparent vessel.
Figure 2:
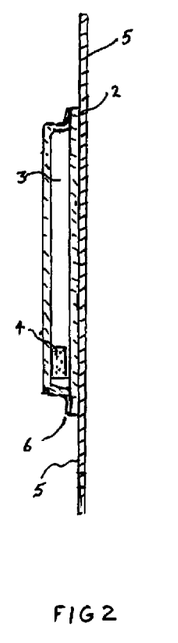
FIG. 2 is a cross sectional view AA of FIG. 1.

Referring to FIG. 1, a freeze thaw warning indicator is shown 1 is composed of a vacuum formed transparent vessel with flanges or edges. The vessel is filled with a liquid (water) that freezes at 32° F., 0° C. 3.

A low density 1 closed cell rigid foam material, smaller than the vessel, that is coated with some vivid color 4 is placed in the vessel 1. The vessel is heat sealed with aluminized film using a low temperature hot melt adhesive on an aluminized polyester film 6.

Many companies are equipped with machinery to vacuum form a transparent vessel and accurately meter and fill the vessel with a liquid. One company that produces such pouches for cosmetic samples is Klocke of America.

Although water 3 is used, other materials supplied by Landec Corporation and Bay Materials having other sharp melting points 3 such as 4° C. or 5° C. have been used. These would be useful for deli cases or grocery stores with refrigerator cases to show that food stored therein were not exposed to degrading high temperatures.

The freezing point of the water 3 may be modified with the addition of glycerin or ethyl alcohol. As shown in the Marks Handbook, pg 4-6, Seventh Edition. For example, 7.36% percent alcohol lowers the freezing point to 26.6° F.

Salt may also be used. The sealed assembly 1 is adhesively attached to a card 5 made of dye cut plastic or chip board. Holes are made on both top and bottom of the card 7 so that the card can be hung in the freezer compartment.

A magnet or other means can also be used. The assembly 1 is hung in the freezer so that the float 4 is on the top, because at room temperature the material 3 in the vessel is a liquid.

Figure 3:
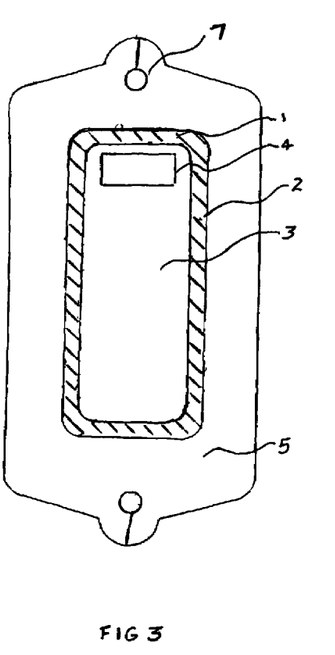
FIG. 3 shows how the invention looks after a thaw event.

As in FIG. 3, the low density material of closed cell foam 4 is on the top. When the liquid 3 freezes, the device has been set. The card 6 is reversed as shown in FIG. 1 with the low density material 4 frozen in place. Upon thawing, the material 3 becomes a liquid and the low density material 4 floats to the top showing that thawing has occurred as shown in FIG. 3.

It has been observed that if incomplete thawing or light thawing has occurred, the float 4 will move partially up because the low density ice floats upward and blocks the path until complete thawing has occurred. Hence it is possible to determine if a light thaw has occurred. In any case, the indicator can be reused indefinitely by the same procedure.

It is possible to use a non-melting, high density material (more dense than the liquid) in a similar assembly as shown in FIG. 1. Component 4 is the high density (steel for example) material.

The device is frozen as in FIG. 1 and then hung in the freezer as shown in FIG. 3. Upon thawing, the high density material 4 moves down as shown in FIG. 1. The whole process can be repeated.

Other float materials such as hollow glass spheres and plastic micro balloon may be used. Lead shot has been used, but the preferred material is the rigid closed cell foam float coated with a bright color.

Figure 4:
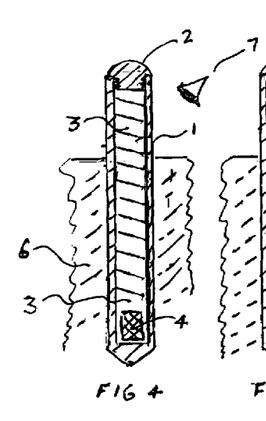
FIG. 4 shows a cross sectional view of a high temperature, critical temperature indicator embedded in some material to be heated.

Referring to FIG. 4, a cross-section of an assembly using a tubular material 1 made from polysulphone Teflon R PFA and TFE designed to be essentially transparent and survive elevated temperatures, such as 350-450° F., is used. A low density, brightly colored float material 4 that is cylindrical or square, but smaller in diameter than the inside diameter of the sealed tubular holder.

A meltable polymer 3, preferably with a sharp melting point depending on the food being cooked, 161° F. which can be extruded in a cylindrical form from various companies such as Landec and Bay Materials, as well as refined paraffin waxes from Yaley Enterprises.

A cap 2 is used to seal the assembly with a transparent cap using a high temperature transparent material or opaque metal.

The device is inserted in the food so that a portion is visually protruding above the food and is quite visible.

Printed or mechanical stops will show the user how far to insert the indicator into the meat to be cooked 6.

Upon heating, the top will be heated first and the heat will diffuse through the food until all the material will melt and the colored float 4 will move to the top and become quite visible, signaling that the interior of the food is done.

Cap 2 can also have a sharp point and upon cooling can be used once again by inserting that end into the food that is to be cooked.

The assembly, unlike spring devices in previous art, merely requires the stacking at room temperature of the various cylindrical components. This makes for easy inexpensive assembly at room temperature without the necessity of melting a material to constrain a spring.

Figures 5, 6:
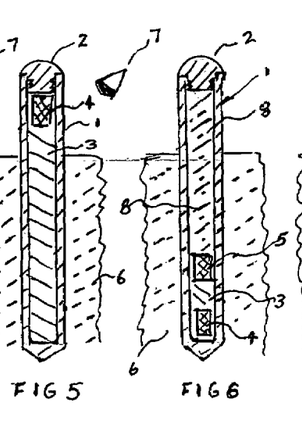
FIG. 5 shows the schematic view of a critical high temperature indicator after the invention has been triggered by a high temperature exposure.
FIG. 6 shows a schematic view of a two stage critical temperature indicator.

FIG. 5 shows the indicator in the done condition. The user or observer 7 can plainly see cooking is complete. The same concept can be used for microwave cooking. The indicator can be part of the microwave tray or bonded to the tray to prevent a user from swallowing the device. A lower temperature plastic vessel may be used.

Figure 7:
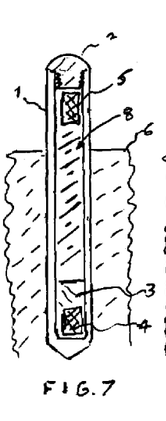
FIG. 7 shows a schematic view of a two stage critical temperature indicator when the first stage has been triggered.

Referring to FIG. 6, a two element design is used. Meltable cylinders 8 would have a lower melting point than a meltable cylinder 3. Upon heating, cylinder 8 becomes a liquid and floats 5, which may be pigmented some bight color, floats to the top as shown in FIG. 7.

Figure 8:
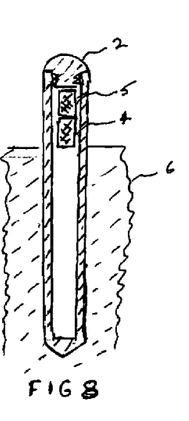
FIG. 8 shows a schematic view of a two stage critical temperature indicator when both stages are triggered.

In FIG. 8, enough heating has occurred so that column 3 of the highest temperature material has melted allowing float 4 to rise to the top.

Float or foam materials of 4 and 5 have a contrasting color, for example, yellow for 5 and bright green for 4. When cooking a turkey, it is important for the cook to have a warning indicator, yellow, to show that cooking is almost complete. The cook can start to complete other parts of the meal. When the final indicator 4 is visible, the cook knows that cooking is complete.

While this concept uses two different temperature meltable columns, one may use two columns of the same temperature, because there is a temperature gradient in the food or meat 6 with the hottest part near the surface.

While this concept shows only two columns and floating indicators, it can be used for many more columns and float indicators.

The outer vessel and cap 2 are made of high temperature plastics such as Teflon, PFA, TFE, and PTFE. This device would not be reusable.

Figure 9:
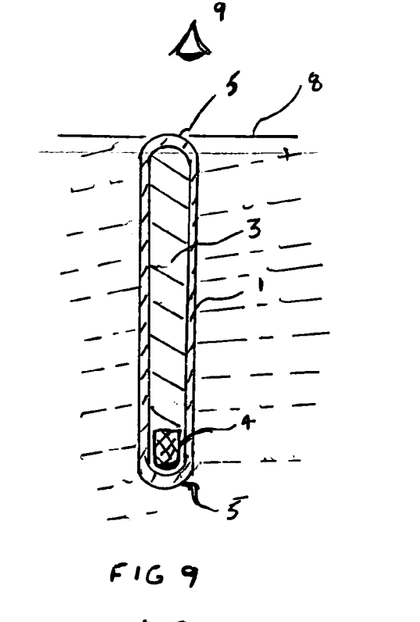
FIG. 9 shows a schematic view of a tubular reusable, resettable critical temperature indicator that shows the interior temperature by viewing the top of the indicator. The unit has not been triggered.
Figure 10:
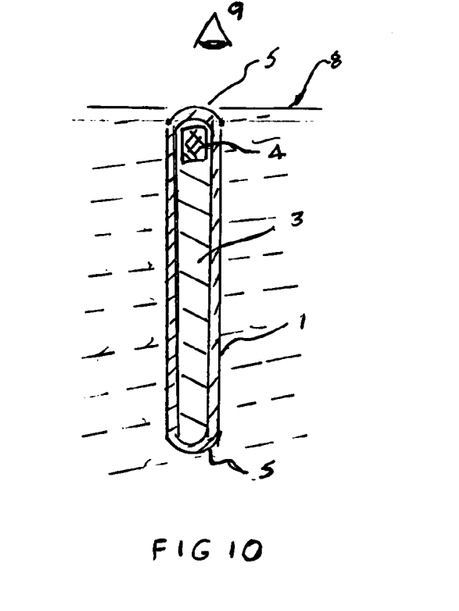
FIG. 10 shows a schematic view of a tubular, reusable, resettable critical temperature indicator after it has been triggered by a temperature event.

In some shipping applications for frozen chicken, frozen blood, pharmaceuticals, fish, etc. one may use a critical temperature indicator shown in FIG. 9 and FIG. 10. Here the indicator is inserted through the cardboard container and is flush 5 with the top of the carton 8. A lower temperature transparent plastic vessel and top may be used as the product will not see very high temperatures.

FIG. 9 shows the indicator before exposure to elevated temperatures and FIG. 10 shows the float 4 after exposure to elevated temperatures.

The advantages to this concept are that the interior of the carton is exposed to some critical temperature indicating a potential temperature abuse and spoilage and the device can be reused. If it is desirable to have only a one use device, one may use two columns of meltable material and two floats.

The top and bottom of the indicator is transparent so that the float material can be seen by the viewer. In all cases, the float material is smaller in diameter than the inside diameter of the vessel so that it can freely float to the top.

Figure 11:
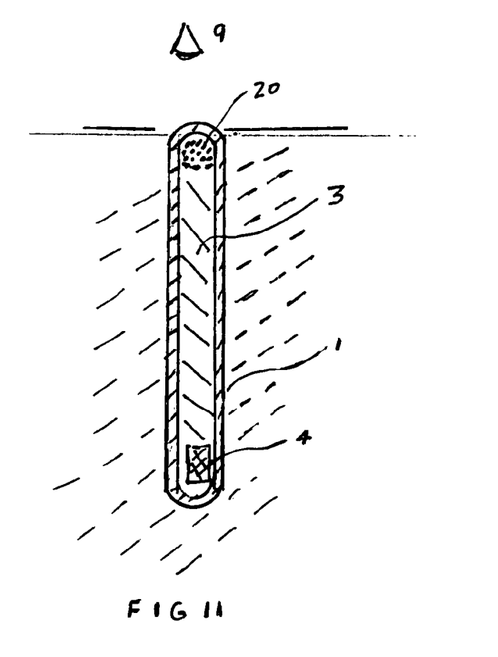
FIG. 11 shows a schematic view of a tubular, reusable indicator using high density and low density materials before reaching a critical temperature.

FIG. 11 shows a critical temperature indicator where 20 uses high density particulates of some color on top. When column 3 a meltable solid, starts to melt, the particulates 20 fall and the viewer will see a change 9 in color on the top of the transparent vessel 1 indicating partial heating has occurred.

Figure 12:
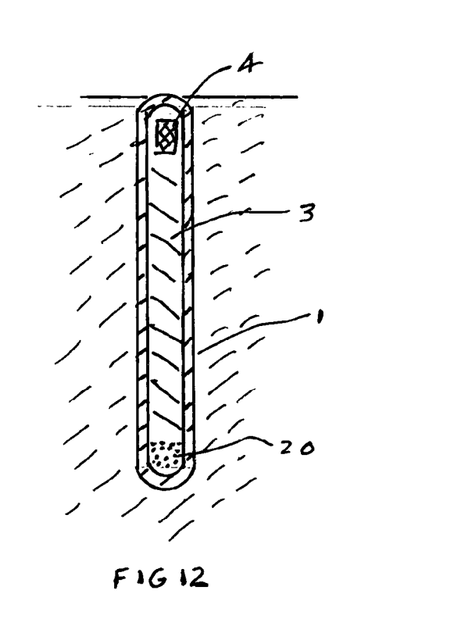
FIG. 12 shows a schematic view of a tubular, reusable indicator using high density and low density materials after reaching a critical temperature.

Upon further heating when the entire column has melted, the particulates 20 will fall to the bottom and the float 4 material of some bright color will go to the top. Sufficient clearance of the float will allow the particulates to reach the bottom as shown in FIG. 12. Hence two color changes will occur; first, when enough heating to release the dense particle and second when complete heat has occurred and the colored floating material reaches the top. In this case, the top of the indicator is flush with the surface.

Figure 13:
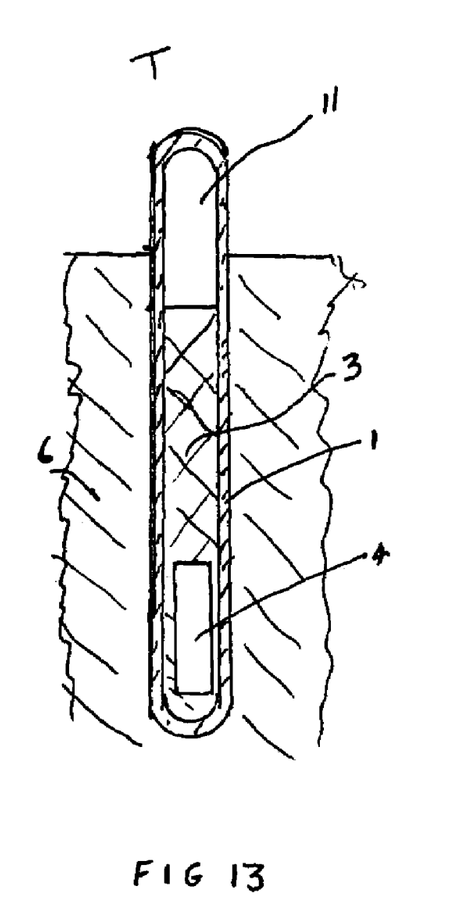
FIG. 13 shows a schematic view of a critical temperature indicator with an insulating air gap before reaching a critical temperature.

A critical temperature indicator is shown in FIG. 13. In this instance, instead of the outside ambient temperature increasing, T is cold and the material 6 is warm. This set of conditions may occur when one is monitoring a fever in an animal or person and wants to obtain a critical temperature.

In FIG. 13, an elongated, low density float material 4 is under a solid meltable material 3 with a sharp melting point at, for example 101° F. If this is inserted in an animal 6 with a fever above, 101° F., the column 3 would melt and the low density float would move to the surface. In this case, there is an insulating gas 11 above the column. If the column extended above the flesh, it would be cooled by the ambient air and a solid preventing the low density material from protruding into the insulating gas chamber and provide easy viewing.

Figure 14:
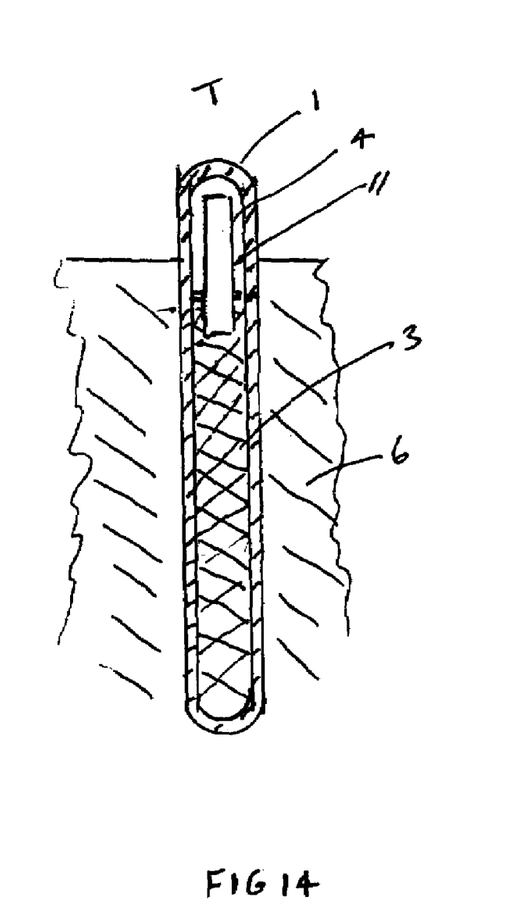
FIG. 14 shows a schematic view of a critical temperature indicator with an insulating air gap after reaching a critical temperature.

The column should be lower than the surrounding flesh by at least the diameter of the vessel as shown in FIG. 14 where the outside material was warm enough to trigger the indicator.

Figure 15:
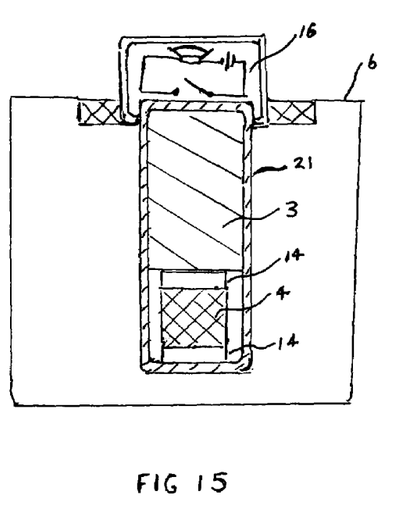
FIG. 15 shows a schematic view of an audible critical temperature indicator before reaching a critical temperature.

Referring to FIG. 15, another embodiment of the temperature indicator of the present invention is shown. A mechanical spring wind up or battery operated bell or buzzer 16 is in close proximity to the top of the vessel 21. It is a flotation device designed to keep the vessel even with the water surface 6. A magnetically activated switch will make an electrical contact or release a latch so that the buzzer can make a warning noise.

Figure 16:
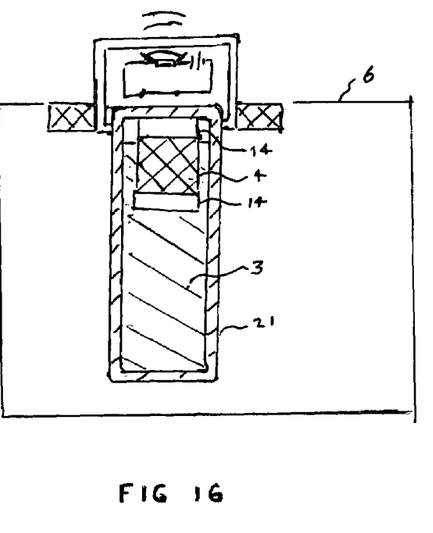
FIG. 16 shows a schematic view of an audible critical temperature indicator after reaching a critical temperature.

Float 4 has a strong permanent magnet 14 on either side. If the water 6 is heated for boiling, an egg or sterilization a certain amount of time will be required to heat the contents of vessel 6 and completely melt the solid element 3 and allow the float to move upward as shown in FIG. 16 so that the close proximity of magnet 14 would cause the switch to close and a buzzing noise would show that the desired temperature and time has been achieved.

The timing is dependent of the melt temperature 3 of the solid and the dimensions of the device. The device is reusable by turning it over after it has cooled so it appears in FIG. 15 with the switch and buzzer on top.

Figure 17:
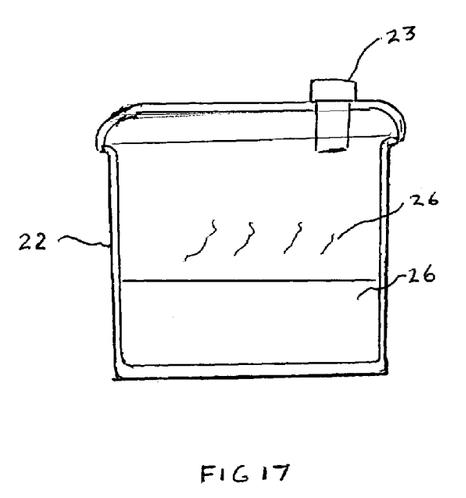
FIG. 17 shows a schematic view of an audible critical temperature indicator mounted in a pressure cooker lid or pot lid.

Referring to FIG. 17 a pressure cooker or pot is shown 22 with a device 23 in the lid. As water and steam 26 rise during cooking, it will heat device 23 which is similar to the device shown in FIG. 15. If sufficient cooking time has elapsed, the meltable solid will move upwards and trigger a buzzer as shown in FIG. 16.

Figure 18:
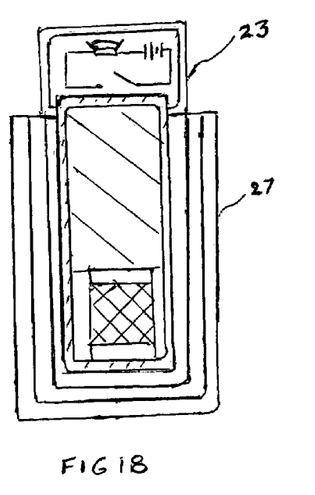
FIG. 18 shows a nested cylinder used with a critical temperature indicator to change the response time.

By using various sizes and melt temperature materials or by changing the wall thickness by using various nested cylinders FIG. 18 around sensing element 23, one may select the best time and temperature for cooking various foods. One may use this for selecting a soft boiled or medium or hard boiled egg essentially changing the thickness for heat diffusion.

While this device is shown on the side of the lid, it could easily be incorporated in the lid handle and may be the preferred design.

The various embodiments of temperature indicators shown herein each provide a simple temperature indicator that is relatively inexpensive to manufacture, thus ensuring widespread use on a variety of food products, and which is easy to use and reliably indicates a desire cooking temperature of a food product.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching.

The embodiments were chosen and described in order to best explain the principles of the invention and its practical application, to thereby enable others skilled in the art to best utilize the invention and various embodiments with various modifications as are suited to the particular use contemplated.

It is intended that the scope of the invention be defined by the Claims appended hereto when read and interpreted according to accepted legal principles such as the doctrine of equivalents and reversal of parts.

I claim:

1. A critical temperature indicator comprising a closed vessel having sealed upper and lower ends, at least one of the ends being a transparent end, the vessel containing at least one meltable solid material, and at least one non-meltable solid float material of a lower density than the meltable solid material positioned below the meltable solid material within the vessel when the vessel is oriented in an upright position with the transparent end at the top, the meltable solid material being transformable into a liquid upon heating to some critical temperature of the meltable solid material to allow the float material to start floating up through the liquid for viewing of the float material at least through the transparent end at the top to show that the critical temperature has been reached.

2. The temperature indicator of claim 1 wherein the float material is a rigid closed cell foam, hollow glass, or plastic beads.

3. The temperature indicator of claim 1 wherein the float material is pigmented.

4. The temperature indicator of claim 1 wherein both sealed ends of the vessel are transparent, and the temperature indicator is reset for use after the liquid returns to the meltable solid material after cooling below the critical temperature by rotating or turning the temperature indicator upside down to reposition the float material below the meltable solid material.

5. The temperature indicator of claim 1 wherein the vessel is a transparent sealed vessel that is filled with a liquid at room temperature that becomes the meltable solid material at some critical temperature below room temperature, and the float material is placed inside the vessel before the ends of the vessel are sealed.

6. The temperature indicator of claim 1 which is mounted on a card that is rotatable 180° to reposition the float material below the meltable solid material for reuse of the temperature indicator after the float material has floated up through the liquid and the liquid has cooled below the critical temperature and returned to the meltable solid material.

7. The temperature indicator of claim 1 wherein the float material partially moves up in the meltable solid material when the meltable solid material partially melts to indicate partial thawing of an other material surrounding at least a portion of the vessel when the vessel is inserted into the other material.

8. The temperature indicator of claim 1 wherein the vessel is a transparent sealed tube, and the meltable solid material is a material that melts above room temperature and is a cylindrical form that closely fits within the tube when in a solid state, and the float material has a smaller diameter than the tube.

9. The temperature indicator of claim 1 wherein the vessel is made of a high temperature material that will withstand cooking temperatures of at least 500° F.

10. The temperature indicator of claim 1 wherein the vessel has a transparent top to show interior critical temperatures of a shipping container when the vessel is placed in the shipping container with the top of the vessel viewable.

11. The temperature indicator of claim 1 wherein the vessel has a transparent top that protrudes from a food product for viewing of the top during cooking of the food product.

12. The temperature indicator of claim 1 which is rotatable or turnable upside down to reposition the float material below the meltable solid material for reuse of the temperature indicator after the float material has floated up through the liquid and the liquid has cooled below the critical temperature and returned to the meltable solid material.

13. The temperature indicator of claim 1 wherein a plurality of meltable solid materials each having different critical melt temperatures and a plurality of non-meltable solid float materials each having a density less than that of each of the meltable solid materials are alternately stacked one upon another within the vessel to give a number of different critical temperatures during heating of a food product in which the vessel is inserted.

14. The temperature indicator of claim 13 wherein the different float materials have different colors to indicate different temperatures when the different meltable solid materials melt and the different float materials start to float in the different melted solid materials.

15. The temperature indicator of claim 1 wherein the float material is a pigmented float material, and the vessel contains a thermal insulating gas on top of the meltable solid material which extends below the surface of an other material into which the vessel is inserted, whereby when the other material is heated and the meltable solid material reaches a critical temperature and becomes a liquid, the pigmented float material starts floating up through the liquid and rises into the gas.

16. The temperature indicator of claim 1 wherein permanent magnets are mounted on top and bottom surfaces of the float material.

17. The temperature indicator of claim 16 further comprising an audible alarm positioned in close proximity to the top of the vessel, and a switch that is activated by one of the permanent magnets when the meltable solid material becomes a liquid and the float material starts floating to the top of the liquid to cause the audible alarm to be sounded.

18. The temperature indicator of claim 17 wherein the vessel is turnable upside down with respect to the alarm to reposition the float material below the meltable solid material for reuse of the temperature indicator after the float material has floated up through the liquid and the liquid has cooled below the critical temperature and returned to the meltable solid material.

19. The temperature indicator of claim 17 that is incorporated in a lid of a pressure cooker or pot to indicate when a critical temperature has been reached during use.

20. The temperature indicator of claim 17 that is built into a handle of a pot lid or pressure cooker to indicate when a critical temperature has been reached during use.

21. The temperature indicator of claim 17 that is fitted with one or more of a plurality of cylinders that are selectively nestable together to change the wall thickness surrounding the temperature indicator to alter the length of time required for the temperature indicator to reach a critical temperature and activate the alarm.

22. A critical temperature indicator comprising a closed vessel having sealed upper and lower ends, at least the upper end being transparent, the vessel containing a meltable solid material and a non-meltable solid material on top of the meltable solid material when in a solid state, the non-meltable solid material having a higher density than the meltable solid material, the meltable solid material becoming a liquid upon heating to some critical temperature to allow the non-meltable solid material to sink to the bottom of the liquid in the vessel to show that the critical temperature has been reached or exceeded, wherein the non-meltable solid material is comprised of pigmented particulates, and wherein the pigmented particulates are on top of a cylinder of the meltable solid material, and a pigmented solid float material having a lower density than the meltable solid material and a different color than the pigmented particulates is below the cylinder of the meltable solid material, whereby upon heating of the temperature indicator to some critical temperature, the meltable solid material becomes a liquid and the pigmented particulates start to sink toward the bottom of the liquid and the float material starts to float up to the top of the liquid so that two color changes occur.

* * * * *